(12) United States Patent
Allen (10) Patent No.: US 11,084,624 B1
(45) Date of Patent: Aug. 10, 2021

(54) NESTABLE, STACKABLE MULTI-STAGE FOOD SERVING SET WITH TEMPERATURE HOLDING FEATURES

(71) Applicant: Thomas J. Allen, Olympia, WA (US)

(72) Inventor: Thomas J. Allen, Olympia, WA (US)

( * ) Notice: Subject to any disclaimer, the term of this patent is extended or adjusted under 35 U.S.C. 154(b) by 0 days.

(21) Appl. No.: 16/916,005

(22) Filed: Jun. 29, 2020

(51) Int. Cl.
| | |
|---|---|
| *B65D 21/032* | (2006.01) |
| *B65D 21/02* | (2006.01) |
| *A47G 19/08* | (2006.01) |
| *B65D 21/04* | (2006.01) |
| *A47J 45/06* | (2006.01) |
| *A47J 27/00* | (2006.01) |
| *A47J 36/34* | (2006.01) |

(52) U.S. Cl.
CPC ......... *B65D 21/0216* (2013.01); *A47G 19/08* (2013.01); *B65D 21/0233* (2013.01); *B65D 21/04* (2013.01); *A47J 27/00* (2013.01); *A47J 27/002* (2013.01); *A47J 36/34* (2013.01); *A47J 45/06* (2013.01); *A47J 45/061* (2013.01)

(58) Field of Classification Search
CPC .................................................. B65D 21/0233
USPC .................................. 206/520, 518, 507, 519
See application file for complete search history.

(56) References Cited

U.S. PATENT DOCUMENTS

| | | | | |
|---|---|---|---|---|
| 2,412,178 | A * | 12/1946 | Seigh ....................... | B65D 7/04 206/519 |
| 2,889,072 | A * | 6/1959 | Lapham ............... | B65D 21/046 206/507 |
| 3,270,913 | A * | 9/1966 | Bridenstine .......... | B65D 21/045 206/507 |
| 3,951,266 | A * | 4/1976 | Brewer .................. | B65D 1/265 206/520 |
| 4,813,543 | A | 3/1989 | Goldberg | |
| 8,047,373 | B2 * | 11/2011 | Murphy ............... | A47B 88/994 206/553 |
| 2003/0094393 | A1 * | 5/2003 | Sahm ....................... | B65D 1/42 206/505 |

OTHER PUBLICATIONS

Puget Sound Seafood Server brochure, www.pugetsoundseafoodserver.com, Olympia, Washington, 2000, 2 pages.

(Continued)

*Primary Examiner* — Stephen J Castellano
(74) *Attorney, Agent, or Firm* — Lowe Graham Jones PLLC (57) ABSTRACT

The present invention is directed toward a food container that including a base, a perimeter wall and first, second and third protrusions. The protrusions are spaced apart from each other and coupled to the wall and the base. Each of the first, second and third protrusions defines a respective support surface that extends radially inward from the wall, a recess in the base and a recess in the wall. Each of the support surfaces is configured to support non-recessed portions of a base of another food container in a stacked configuration. Each of the recesses in the wall and the base are configured to receive a support surface of the other food container in a nested configuration.

18 Claims, 7 Drawing Sheets

(56) References Cited

OTHER PUBLICATIONS

Advertisement for Global Industrial(TM) Stack and Nest Storage Container SNT230 No Lid, globalindustrial.com, retrieved from the Internet on Jun. 29, 2020, at https://www.globalindustrial.com/p/storage/bins-totes-containers/shipping-security/shipping-container-without-lid-23-1-2x19-1-2x13?infoParam.campaignId=T9F&gclid=Cj0KCQjwIN32BRCCARIsADZ-J4tvr7pNhGHjplC3MAsAhubGp0rriy4MdKBfrAFZaHeMTbt0DIS0F_saAjylEALw_wcB, 5 pages.

Holzner, S., "How Surface Area Affects the Force of Friction," Dummies, retrieved from the Internet at https://www.dummies.com/education/science/physics/how-surface-area-affects-the-force-of-friction/, on Dec. 4, 2020, 8 pages.

* cited by examiner

NESTABLE, STACKABLE MULTI-STAGE FOOD SERVING SET WITH TEMPERATURE HOLDING FEATURES

FIELD OF THE INVENTION

The invention relates generally to containers and, more particularly, but not limited to, containers that facilitate stacking of the containers for serving food and that facilitate nesting the containers for storage when empty.

BACKGROUND OF THE INVENTION

When serving food to large numbers of people buffet style (that is, self-service style), there is a conflict between attractive food presentation with healthy temperature-keeping on one hand and labor efficiency and diner convenience on the other hand. The least expensive way to serve such food is to put it all out at the same time, heaped on a few large serving trays, with the result that, as individual pieces of food are picked up by the diners, overall presentation looks worse and the "hot" food items get colder and the "cold" food items get warmer. A further problem with this method of serving occurs with food that must be served on ice, like shrimp or oysters on the half-shell; as the ice melts, water builds up in the serving trays, making for a sloppy, unattractive, unhealthy mess.

An alternative is to lay out the food, attractively arranged, on smaller serving dishes, which are hot, cold or iced as necessary, with server personnel making constant trips to and from the kitchen. This makes for better food presentation with improved hot and cold maintenance, but results in increased labor costs, potential for accidents and disruptions, and need for bulky serving dishes to be stored or transported between serving locations.

It would be an advancement in the art to provide a food serving set with temperature holding features that facilitates compact storage and attractive food presentation.

SUMMARY OF THE INVENTION

In one aspect of the invention, an improved nestable, stackable, multi-stage food-serving set consisting of a plurality of containers is described that includes temperature holding features and facilitates compact storage. The container preferably includes a base, a perimeter wall coupled to the base, and three protrusions. Each of the protrusions is preferably coupled to the base and to the wall and spaced apart from the other protrusions. Each of the first, second and third protrusions preferably defines a support surface that extends radially inward from the wall, a recess in the base and a recess in the wall.

In certain embodiments, each of the first, second and third protrusions includes a bottom end portion and a top end portion that is narrower than the corresponding bottom end portion.

In alternative embodiments, each of the support surfaces is preferably configured to support non-recessed portions of a base of another food container in a stacked configuration. Each of the recesses in the wall and the base are preferably configured to receive a support surface of the other food container in a nested configuration.

In yet alternative embodiments, each of the first, second and third protrusions preferably defines a stabilizer disposed above a corresponding support surface. The stabilizers are preferably configured to horizontally stabilize the other food container in the stacked configuration. The wall preferably defines a top diameter and a lower diameter that is smaller than the top diameter. Each of the stabilizers preferably extends no farther radially inward from the wall than approximately half of the difference between the top diameter and the lower diameter.

The container preferably includes no more than three support surfaces that are configured to support the non-recessed portions of the base of the other food container in the stacked configuration. The first, second and third protrusions are preferably distributed approximately 120° from each other about a center of the base. In certain embodiments, a drain hole extends through the base.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
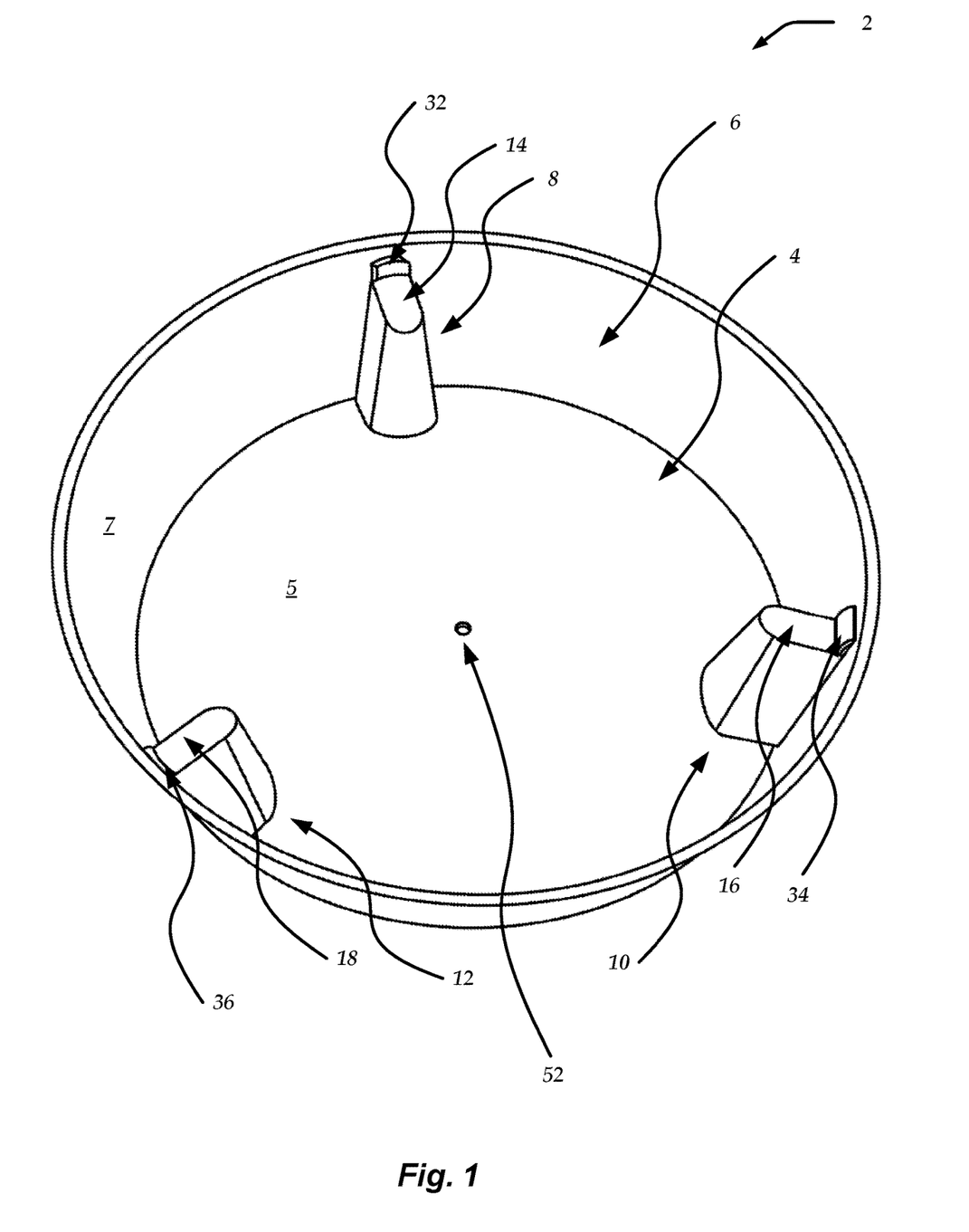
FIG. 1 is a perspective overhead view of a preferred food-serving container.

A preferred food container 2 in accordance with the principles of the present food-serving set invention is shown in FIG. 1. Food container 2 preferably has a base 4 having an inner surface 5 and an outwardly inclined perimeter wall 6 having an inner surface 7. Food container 2 preferably includes at least three protrusions 8, 10, 12 extending upward from inner surface 5 of base 4 and inward from inner surface 7 of perimeter wall 6, which facilitate arranging a set of food containers in both a stacked configuration (see FIG. 4) and a nested configuration (see FIG. 5). The protrusions are preferably substantially evenly distributed about the perimeter of food container 2, but their precise location along the perimeter may vary, for example, according to need for particular service circumstances. In a preferred embodiment with three protrusions 8, 10, 12 shown in FIG. 1, the protrusions are preferably disposed at approximately 120° intervals about the perimeter of food container 2.

Each of protrusions 8, 10, 12 preferably has a corresponding support surface 14, 16, 18 that is substantially horizontally disposed and extends radially inward from the inner surface 7 of perimeter wall 6. Protrusions 8, 10, 12 preferably have corresponding stabilizers 32, 34, 36 that extend upward from corresponding support surfaces 14, 16, 18 and inward from the inner surface 7 of perimeter wall 6. In an alternative embodiment, each stabilizer 32, 34, 36 includes a corresponding flange (not shown) that extends upward from corresponding support surfaces 8, 10, 12 and that are spaced apart and radially inward from perimeter wall 6. Support surfaces 14, 16, 18 of protrusions 8, 10, 12 provide vertical support to a food container disposed on the support surfaces when a set of such food containers are arranged in the stacked configuration (see FIG. 4). Stabilizers 32, 34, 36 preferably provide horizontal stabilization to the food containers when they are arranged in the stacked configuration.

Figure 2:
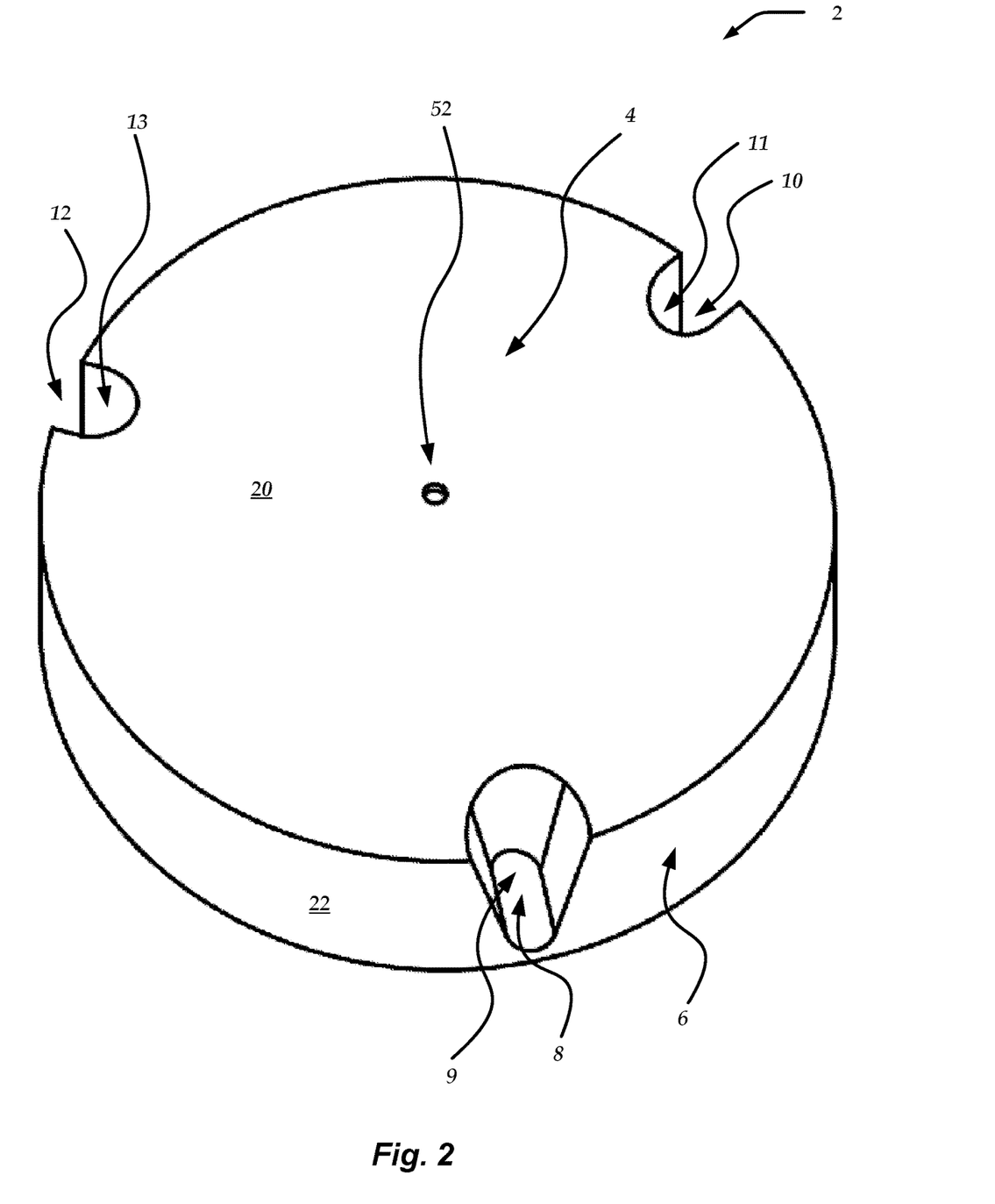
FIG. 2 is a perspective bottom view of the food-serving container of FIG. 1.

As shown in FIG. 2, protrusions 8, 10, 12 preferably define recesses 9, 11, 13 in an outer surface 20 of base 4 and an outer surface 22 of perimeter wall 6. Recesses 9, 11, 13 facilitate receiving the protrusions of a food container arranged immediately below the instant container in the nested configuration (see FIG. 5). Stabilizers 32, 34, 36 may be solid as shown in FIG. 2 or may be hollow and open from the underside to facilitate receiving the upper surface of the immediately lower stabilizer in the nested configuration (now shown). As also shown in FIG. 2, the preferred outer surface 20 of base 4 is preferably substantially flat to facilitate resting stably on support surfaces 14, 16, 18 in the stacked configuration (see FIG. 4).

Figure 6:
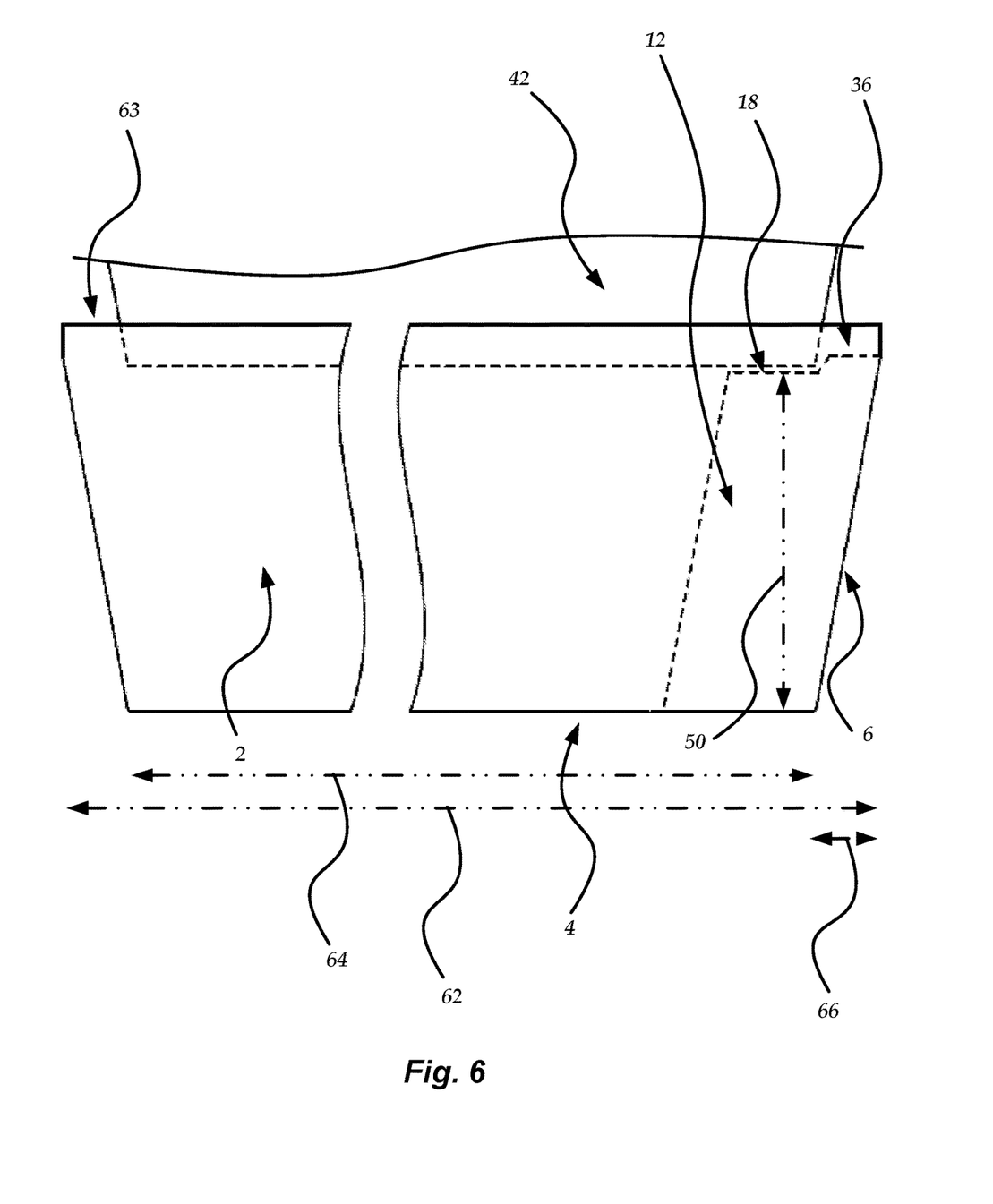
FIG. 6 is a cross-sectional view of two preferred food-serving containers in the stacked configuration.

As shown in FIG. 6, the outward inclination of perimeter wall 6 results in a top diameter 62 of an upper opening 63 of food container 2 being greater than a bottom diameter 64 of base 4 of food container 2. The top diameter 62 is preferably approximately 12 inches. The most radially inward portion of each stabilizer 32, 34, 36 is offset radially inward from perimeter wall 6 by distance 66 that is preferably approximately half the difference between top diameter 62 and bottom diameter 64. In different embodiment, for example, the ratio may be one or two thirds of the difference. As a result, stabilizers 32, 34, 36 assist in preventing food containers stacked on protrusions 8, 10, 12 in the stacked configuration from sliding toward or away from perimeter wall 6.

Figure 3:
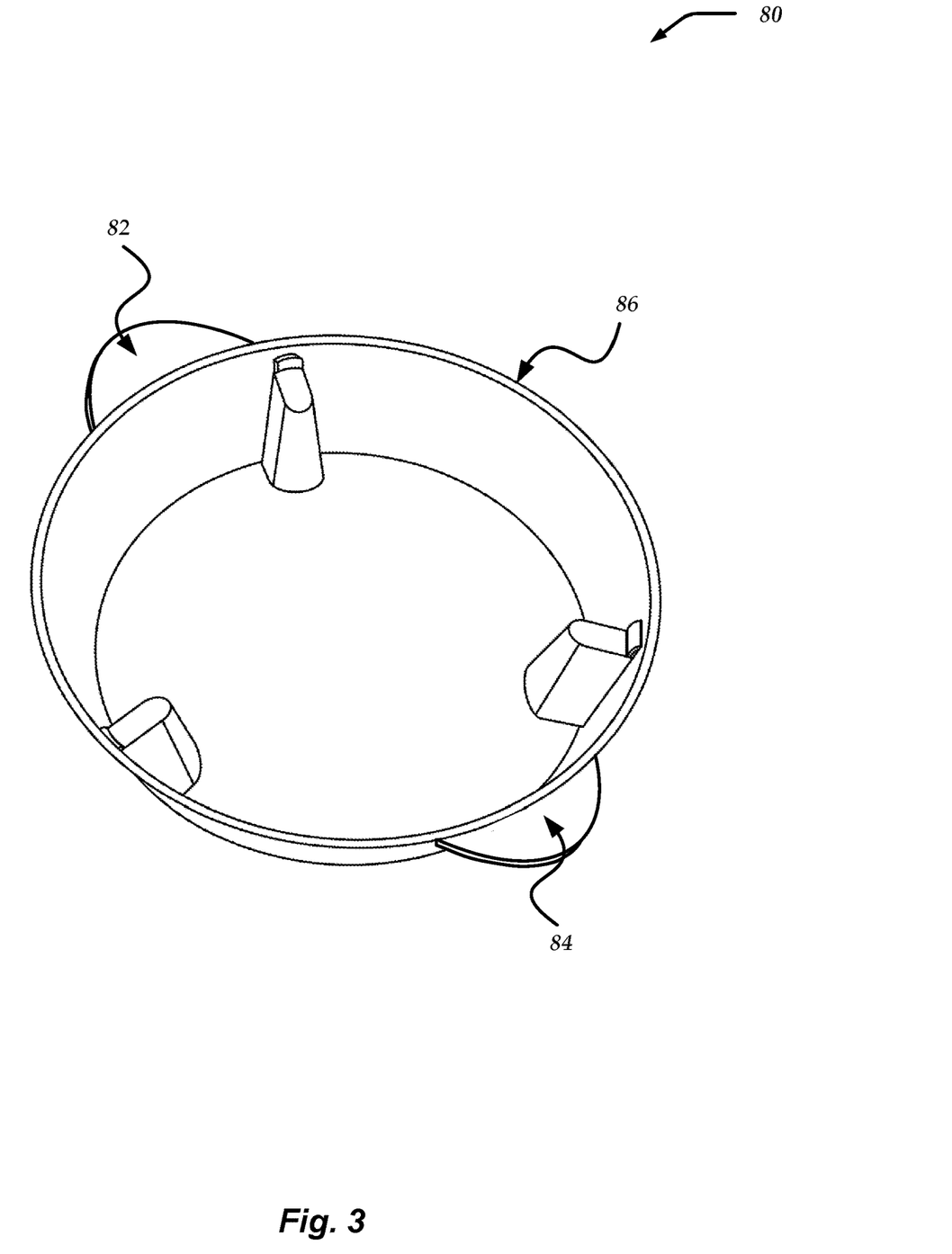
FIG. 3 is a perspective overhead view of another preferred food-serving container.

Another preferred food container 80 of the present food-serving set invention is shown in FIG. 3. The food container 80 is preferably the same as or similar to the food container 2, except the food container 80 is preferably devoid of any drain holes and preferably includes two handles 82, 84 on opposite sides of the container 80 to facilitate carrying the set in the stacked or nested configurations with the food container 80 as the bottommost container (see FIGS. 4 and 5). The handles 82, 84 are preferably substantially coplanar with the top edge 86 of the food container. The handles 82, 84 are preferably radiused and, most preferably, have a radius of approximately 1.5 inches.

Figure 4:
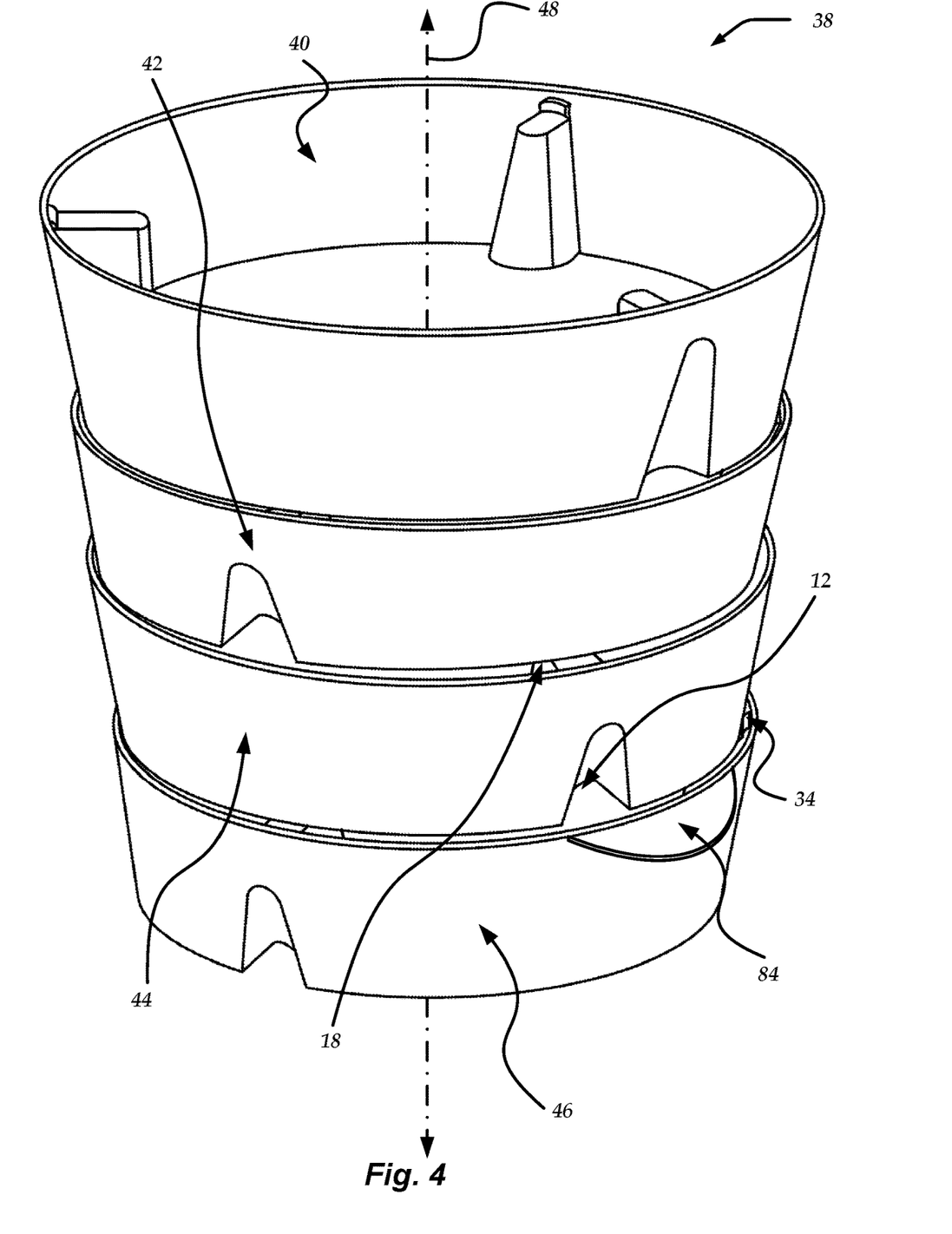
FIG. 4 is a perspective view of multiple preferred food-serving containers in a stacked configuration.
Figure 5:
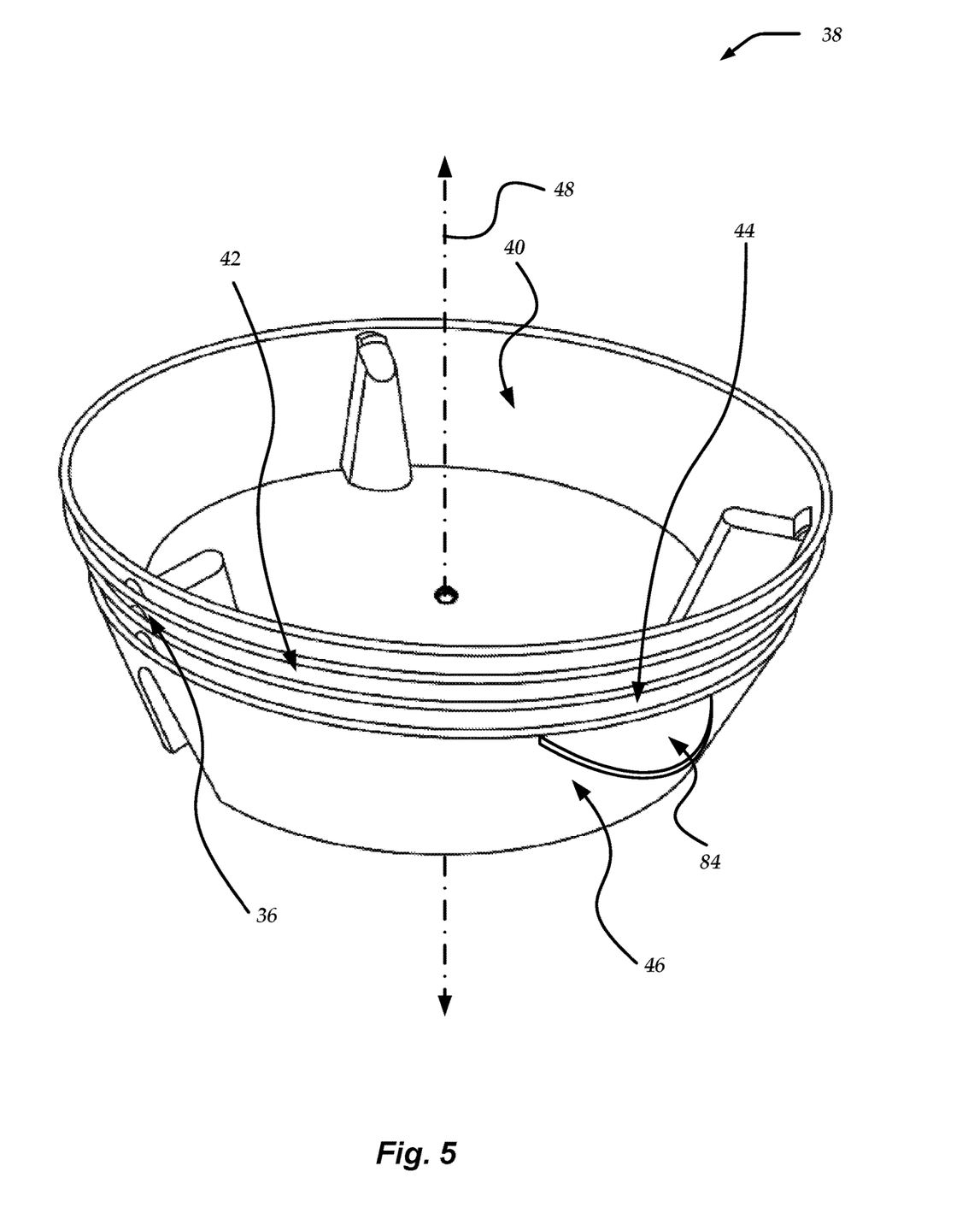
FIG. 5 is a perspective side view of the food-serving containers of FIG. 4 in a nested configuration.

FIGS. 4 and 5 show a food-serving set 38 of food containers 40, 42, 44, 46, each of which are preferably structurally the same as or similar to food container 2 described above. For purposes of this description, each container 40, 42, 44, 46 has similar corresponding structural features as described above with respect to container 2, and references used with respect to container 2 will refer to corresponding structural features of containers 40, 42, 44, 46.

Food containers 40, 42, 44 may be pivotally arranged about vertical axis 48 to circumferentially align or offset the respective protrusions of food containers 40, 42, 44 with or from the protrusions of the immediately lower food container 42, 44, 46 to selectively arrange the food-service set in the stacked configuration (see FIG. 4) or the nested configuration (see FIG. 5). The stacked configuration allows for outer surface 20 of base 4 of each food container to be spaced apart from inner surface 5 of the base of the immediately lower food container, thereby preventing outer surface 20 of the base of a food container from contacting food stored in the immediately lower food container. The distance of such spacing is defined by elevation 50 of the protrusions in the immediately lower food container (see FIG. 6), and the food should be stored below elevation 50 of the support surfaces of the protrusions of the immediately lower food container. Elevation 50 can be varied depending on the particular structural configuration of protrusions 8, 10, 12, depending on the overall size and shape of the container desired for particular service configurations.

As shown in FIGS. 1 and 2, one or more of food containers 40, 42, 44 may include drain hole 52. Food containers with drain holes are preferably used for serving cold or iced food. Food containers without drain holes are preferably used to serve warm or hot food or used to serve cold or iced food but stacked at the bottom of set 38 to facilitate capturing water from melted ice in middle or upper food containers. Food containers storing warm or hot food are preferably stacked above food containers storing cold or iced food to facilitate preventing heating cold or iced food and prevent cooling of warm or hot food. In some cases, all the containers in the stack except the bottom one preferably contain the food on ice; the water from the melting ice preferably drains away from the ice and accumulates in the bottom container. The ice preferably lasts longer and food preferably stays colder if water is drained away from the ice as it melts.

Figure 7:
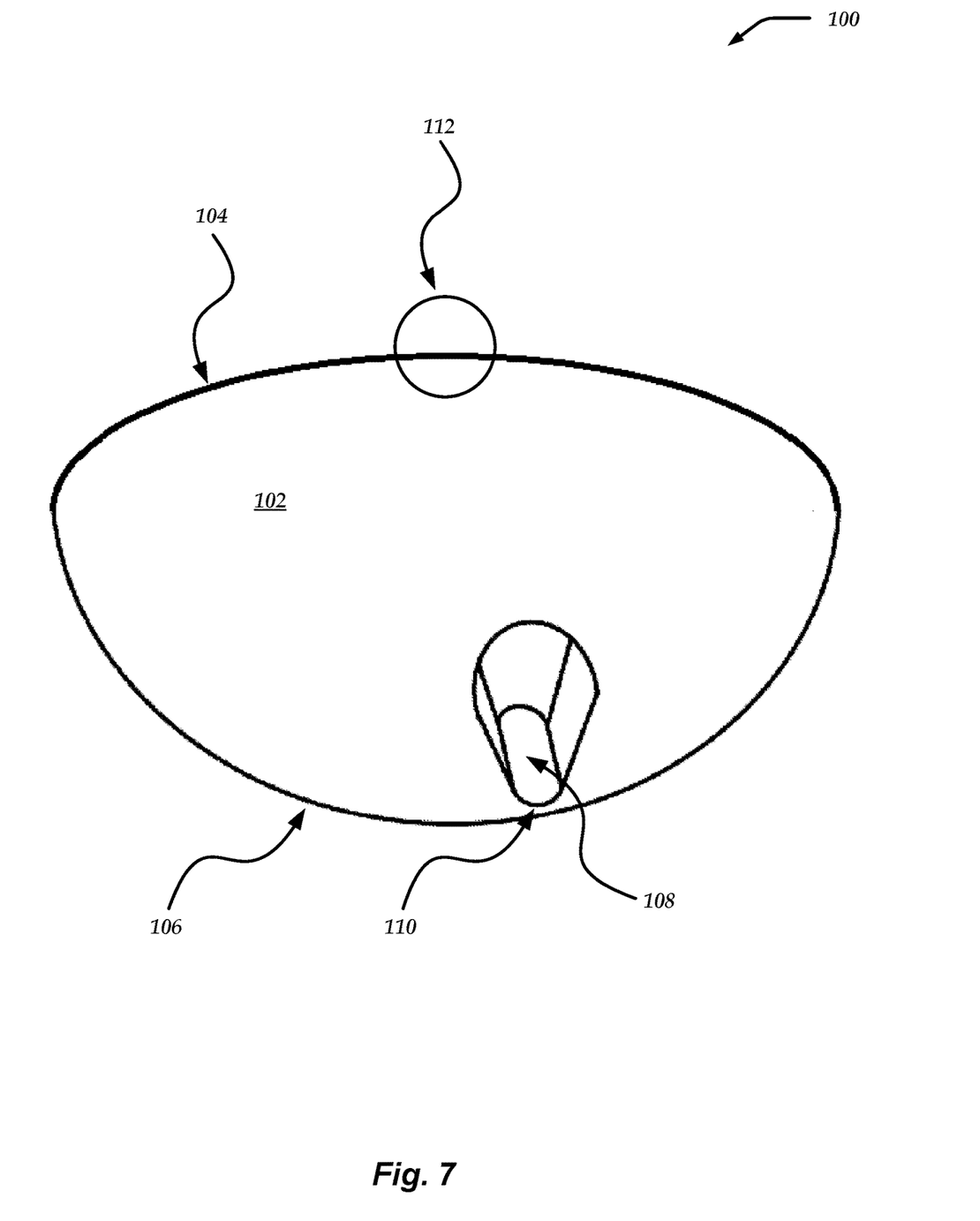
FIG. 7 is a perspective side view of a preferred lid.

A preferred lid 100 of the present food-serving set invention is shown in FIG. 7. The lid 100 preferably has a generally convex outer surface 102 and a generally concave inner surface (now shown). Accordingly, the top profile 104 of the lid 100 is preferably domed. The perimeter lip 106 of the lid 100 preferably has substantially the same shape as the upper opening 63 of at least the top container 40. The outer diameter of the perimeter lip 106 of the lid 100 is preferably substantially the same as the bottom diameter 64 of at least the top container 40. Accordingly, when the lid 100 is placed on the top container 40 when the set 38 is in the stacked configuration, the lid 100 substantially encloses the food in the top container 40. The lid 100 preferably has a knob or, as shown in FIG. 7, a finger hole 112 to facilitate removing the lid 100 from the top container 40. Accordingly, when the set 38 is in the nested configuration, the lid 100 is preferably inverted (concave side of the lid 100 facing upward) in the top container 40 to facilitate compact storage of the lid 100 in the top container 40 (not shown).

In some versions, the lid 100 has substantially the same number of recesses such as recess 108 as the top container 40 has protrusions such as protrusions 8, 10, 12. In these versions, the outer diameter of the perimeter lip 106 of the lid 100 is preferably substantially the same as the diameter 64 of the upper opening 63. The radially outermost edges of the recesses such as the radially outermost edge 110 preferably define a shape such as a circle that has a cross-sectional length or diameter that is substantially the same as the bottom diameter 64 of the top container 40. Accordingly, when the set 38 is in the nested configuration, the lid 100 is preferably inverted in the top container 40 with the recesses in the lid 100 receiving the protrusions in the top container 40 to further facilitate compact storage of the lid 100 in the top container 40.

Food-serving set 38 facilitates distribution of all food, for example at a buffet table, at the same time, in multiple stacks of serving containers, each with food items attractively arranged inside each container. As soon as the food in top container 40 in the stack of containers 40, 42, 44, 46 is used up, the container can be removed, revealing a second container filled with food, which can be removed in turn when empty, revealing a third, and so on.

Removing the top serving containers from the stack as they are emptied requires far less server labor than is required for constant reservice from the kitchen and is far less disruptive to the diners than when the food-serving set of the present invention is not used. The present invention further provides support for stacked containers even without having food in the lower containers, maintaining clean separately of containers and facilitating ease in cleaning used containers.

In certain embodiments, the stacking design and the fact that the uppermost containers are preferably removed when they are emptied cuts down on heat loss and heat gain from and to the food so there is superior heat-keeping and cold-keeping with this set.

The fact that the similar or identical serving containers can be both nestable and stackable (an apparent contradiction) is due to their unique design. The containers are preferably made of relatively thin material with substantially straight sides and a slightly tapered design. That is, the diameter of the top of each container is preferably slightly greater than the diameter of the bottom of each container, so they can fit ("nest"), one on top of and inside the other for storage and transport. The degree of taper may be varied depending on the precise size and configuration of the food-serving set, based on particular needs and circumstances.

Among the advantages of the present invention is the stackable nature of containers. This is accomplished through use of preferably narrow, stepped protrusions, preferably integrated with the container sidewalls and bottom, that support and center the upper container over the container beneath it. The food-service set preferably includes three protrusions spaced at 120 degrees around the perimeter, but may include a different number of protrusions at a different spacing, e.g., four protrusions at 90 degree intervals.

In a preferred embodiment, the protrusions are preferably cast or formed to couple to the perimeter walls and base of the containers, with the bottoms of the protrusion forms being wider than the tops of the protrusions. Also, in the preferred embodiment, the protrusions are hollow and open on the bottom and outside, which allows the protrusions to "nest" into each other when aligned over each other when the containers are stored.

In use, an upper container is preferably stacked over and supported by a lower container when the upper container is rotated a few degrees so that the protrusion are not aligned over each other. The stepped tops of the lower container protrusions preferably support and center the bottom of the upper container. This stackable/nestable feature makes for very efficient storage, utilizing less than 25% of the volume that would be required if the containers are not nestable.

Hot and Cold Keeping:

In an alternative embodiment, reusable ceramic, metal or plastic discs are provided, each configured to fit into along the base of the serving containers. In a preferred operation, these are heated or refrigerated, depending on the desired usage, then placed into the containers before food is added to assist heat and cold keeping.

Iced Food Design Option:

In an alternative embodiment, the set is preferably provided with a number of the serving containers having one or more drain holes in the center of their bottoms. The serving stacks are preferably then set up so that all of the containers in a particular stack except the bottom one have drain holes. In the application of this embodiment, iced food like shrimp, oysters on the half-shell, ice cream sandwiches, etc., may be served in the upper containers with water from the melting ice draining down to the bottom (collector) container. Food that has no liquid may be served in containers without drain holes.

In the above-described food-serving set, food containers 40, 42, 44, 46 are preferably hydro-formed or stamped from stainless steel, aluminum, or other materials or cast or vacuum-formed plastic, but may be made from any suitable material.

In one embodiment, using stainless steel versions of the preferred model shown, ten containers can preferably be stored in less than twice the space occupied by one container. For example, one typical container by itself is preferably 3 inches high; eight of those same containers nested together are preferably only 4½ inches high total. Each protrusion preferably has a triangular cross section with the top being narrower than the bottom and the overall wall thickness preferably being the same as the wall thickness of the container. In some versions, the containers are larger or smaller, square, oblong, oval-shaped or free-form artistic designs and some have more than three support ridges, but all preferably utilize the same nestable, stackable features. Another feature preferably includes ceramic, oven-heated heat-storing discs or battery-powered heat emitting discs that are preferably placed in each container to keep the food hot.

As used herein, the following terms take the meanings explicitly associated herein, unless the context clearly dictates otherwise. The term "or" is an inclusive grammatical conjunction to indicate that one or more of the connected terms may be employed. For example, the phrase "one or more A, B, or C" or the phrase "one or more As, Bs, or Cs" is employed to discretely disclose each of the following: (i) one or more As, (ii) one or more Bs, (iii) one or more Cs, (iv) one or more As and one or more Bs, (v) one or more As and one or more Cs, (vi) one or more Bs and one or more Cs and (vii) one or more As, one or more Bs and one or more Cs. The term "based on" as used herein is not exclusive and allows for being based on additional factors not described. The articles "a," "an," and "the" include plural references. Plural references are intended to also disclose the singular. The term "one or more" or "at least one" discloses no more than a single one or more than one, up to and including all.

The term "transverse" refers to a non-parallel orientation and includes but is not limited to a perpendicular orientation. The term "configured" refers to an element being one or more of sized, dimensioned, positioned, or oriented to achieve or provide the recited function or result. The term "approximately" or "substantially" refers to the described value or a range of values that include all values within 5, 10, 20, 30, 40, or 50 percent of the described value. For example, the term "substantially parallel" refers to parallel or within 5, 10, 15, 20, 25, 30, 35, 40, or 45 degrees of parallel. As another example, the term "substantially horizontal" refers to horizontal or within 5, 10, 15, 20, 25, 30, 35, 40, or 45 degrees of horizontal. The term "directly coupled" refers to a component that contacts (for example, fastened, adhered, or integral to) another component. The term "indirectly coupled" refers to a component that is coupled to one or more other components that are coupled to a second component or one or more further components that are coupled to the second component. The term "coupled" should be understood to disclose both direct and indirect coupling of components or elements that are described as being coupled to each other.

While the preferred embodiment of the invention has been illustrated and described, as noted above, many changes can be made without departing from the spirit and scope of the invention. For example, each disclosure of an element or component preferably having a feature or characteristic is intended to also disclose the element or component as being devoid of that feature or characteristic, unless the principles of the invention clearly dictate otherwise. Accordingly, the scope of the invention is not limited by the disclosure of the preferred embodiments. Instead, the invention should be determined entirely by reference to the claims that follow. Moreover, each feature, characteristic, element, or component described herein may be implemented in combination with one or more other features, characteristics, elements, or components described herein. It should also be noted that the claim dependencies or combinations of elements recited in the claims does not reflect an intention to forgo claiming other subject matter disclosed herein. Instead, this disclosure is intended to also disclose the subject matter of any combination of any two or more of the claims, such that subsequent claim sets may recite that any one of the dependent claims depends from any other one or more claims, up to and including all other claims in the alternative (for example, "The food container of any one of the preceding or subsequent claims . . . ."). This disclosure is also intended to disclose the subject matter of any one of the dependent claims, as if it was an independent claim, with or without all or a portion of the subject matter of the original independent claim(s) or any other subject matter disclosed herein.

The embodiments of the invention in which an exclusive property or privilege is claimed are defined as follows:

1. A food container comprising:
   a base;
   a perimeter wall coupled to the base;
   a first protrusion coupled to the base and to the wall;
   a second protrusion coupled to the base and to the wall, the second protrusion being spaced apart from the first protrusion; and
   a third protrusion coupled to the base and to the wall, the third protrusion being spaced apart from the first and second protrusions,
   wherein each of the first, second and third protrusions defines
      a recess in the base;
      a recess in the wall; and
      a support surface that extends radially inward from the wall, and
   wherein each of the support surfaces is configured to support non-recessed portions of a base of a second food container in a stacked configuration and each of the recesses in the base and the wall is configured to receive a support surface of a third food container in a nested configuration,
   wherein each of the first, second and third protrusions has a stabilizer disposed above the support surfaces, each stabilizer extending radially inward from the wall, each stabilizer configured to horizontally stabilize the other food container in the stacked configuration,
   wherein each stabilizer has a topmost portion that is disposed below and spaced apart from an upper lip of the wall by a distance that exceeds a height of a transition between the upper lip of the wall and an inner surface of the wall.

2. The food container of claim 1, wherein each of the first, second and third protrusions defines each stabilizer disposed above the support surfaces.

3. The food container of claim 1, wherein the wall defines a top diameter and a lower diameter that is smaller than the top diameter, each stabilizer extending no farther radially inward from the wall than approximately half a difference between the top diameter and the lower diameter.

4. The food container of claim 1, wherein the container includes no more than three support surfaces that are configured to support the non-recessed portions of the base of the other food container in the stacked configuration.

5. The food container of claim 1, wherein the first, second and third protrusions are distributed approximately 120° from each other about a center of the base.

6. The food container of claim 1, further including a drain hole extending through the base.

7. The food container of claim 1, wherein each of the first, second and third protrusion has a bottom end portion and a top end portion, wherein each of the top end portions is narrower than the bottom end portions.

8. The food container of claim 1, wherein a first stabilizer is disposed above the support surface of the first protrusion, a second stabilizer is disposed above the support surface of the second protrusion, and a third stabilizer is disposed above the support surface of the third protrusion, each of the first, second, and third stabilizers being separate and distinct from each other.

9. A food container comprising:
   a base;
   a perimeter wall coupled to the base;
   a first protrusion coupled to the base and to the wall;
   a second protrusion coupled to the base and to the wall, the second protrusion being spaced apart from the first protrusion; and
   a third protrusion coupled to the base and to the wall, the third protrusion being spaced apart from the first and second protrusions,
   wherein each of the first, second and third protrusions defines
      a recess in the base;
      a recess in the wall; and
      a support surface that extends radially inward from the wall, and
   wherein each of the support surfaces is configured to support non-recessed portions of a base of a second food container in a stacked configuration and each of the recesses in the base and the wall is configured to receive a support surface of a third food container in a nested configuration,
   wherein the container includes no more than three support surfaces that are configured to support the non-recessed portions of the base of the other food container in the stacked configuration,
   wherein each of the first, second and third protrusions has a stabilizer disposed above the support surfaces, each stabilizer defining an inner stabilizing surface that is disposed radially inward from the wall, each stabilizer configured to horizontally stabilize the other food container in the stacked configuration,
   wherein each stabilizer has a topmost portion that is disposed below and spaced apart from an upper lip of the wall by a distance that exceeds a height of a transition between the upper lip of the wall and an inner surface of the wall.

10. The food container of claim 9, wherein the first, second and third protrusions are distributed approximately 120° from each other about a center of the base.

11. A set of food containers, comprising:
    a first food container having:
       a first base;
       a first perimeter wall coupled to the first base;
       a first protrusion coupled to the first base and to the first wall;
       a second protrusion coupled to the first base and to the first wall, the second protrusion being spaced apart from the first protrusion; and a third protrusion coupled to the first base and to the first wall, the third protrusion being spaced apart from the first and second protrusions, wherein each of the first, second and third protrusions defines a first support surface that extends radially inward from the first wall, a first recess in the first base and a first recess in the first wall; and a second food container having:

a second base;

a second perimeter wall coupled to the second base;

a fourth protrusion coupled to the second base and to the second wall;

a fifth protrusion coupled to the second base and to the second wall, the fifth protrusion being spaced apart from the fourth protrusion; and a sixth protrusion coupled to the second base and to the second wall, the sixth protrusion being spaced apart from the fourth and fifth protrusions, wherein each of the fourth, fifth and sixth protrusions defines a second support surface that extends radially inward from the second wall, a second recess in the second base and a second recess in the second wall, wherein each of the fourth, fifth and sixth protrusions has a stabilizer disposed above the second support surfaces, each stabilizer extending radially inward from the second wall, each stabilizer configured to horizontally stabilize the first food container in the stacked configuration, wherein each stabilizer has a topmost portion that is disposed below and spaced apart from an upper lip of the second wall by a distance that exceeds a height of a transition between the upper lip of the second wall and an inner surface of the second wall, wherein each of the second support surfaces of the second food container are configured to support non-recessed portions of the first base of the first food container in a stacked configuration, and each of the respective first recesses in the first wall and the first base of the first food container are configured to receive the second support surfaces of the second food container in a nested configuration, wherein each second support surface defines a longitudinal dimension that extends along a radius of the second wall, a support length measured along the longitudinal dimension from an innermost portion of the second support surface on the longitudinal dimension to an innermost portion of one of the stabilizers on the longitudinal dimension and a support width measured orthogonal to the longitudinal axis at a widest portion of the support surface between the innermost portion of the second support surface and the innermost portion of the one of the stabilizers, the support length being greater than the support width.

12. The set of food containers of claim 11, wherein each of the fourth, fifth and sixth protrusions defines each stabilizer disposed above the second support surfaces.

13. The set of food containers of claim 11, wherein the second wall defines a top diameter, the first wall defining a lower diameter that is smaller than the top diameter, each stabilizer extending no farther radially inward from the second wall than approximately half a difference between the top diameter and the lower diameter.

14. The set of food containers of claim 11, wherein the second container includes no more than three second support surfaces that are configured to support the non-recessed portions of the base of the first food container in the stacked configuration.

15. The set of food containers of claim 11, wherein the first, second and third protrusions are distributed approximately 120° from each other about a center of the first base.

16. The set of food containers of claim 11, further including a drain hole extending through the first base.

17. The set of food containers of claim 16, wherein the second base is devoid of a drain hole.

18. The set of food containers of claim 11, wherein each of the first, second and third protrusions has a bottom end portion and a top end portion, each of the top end portions is narrower than the bottom end portions.

* * * * *